2 Sheets--Sheet 1.
H. PALMIERI.
Toilet-Mirror.
No. 167,558. Patented Sept. 7, 1875.
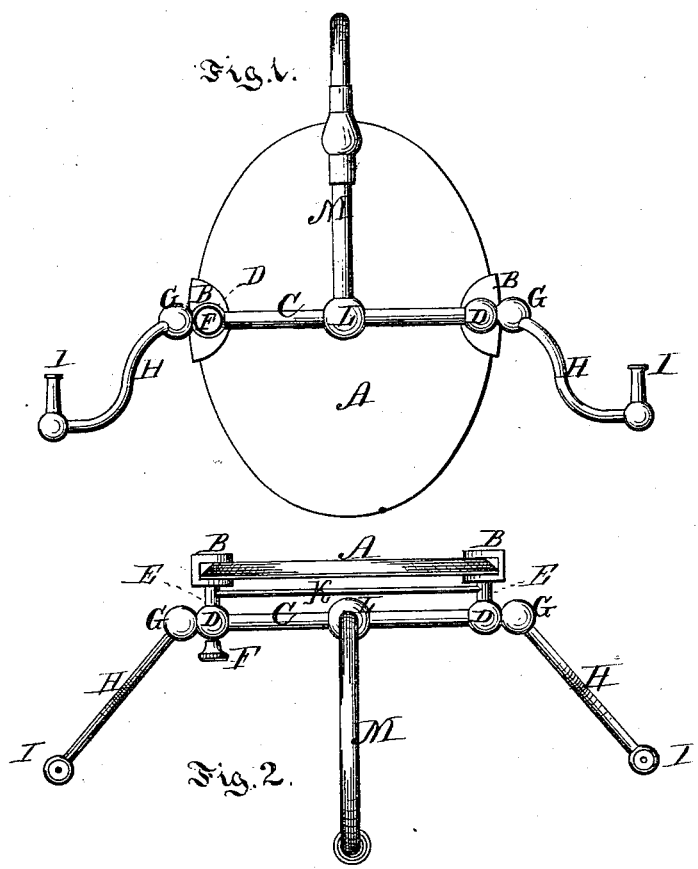
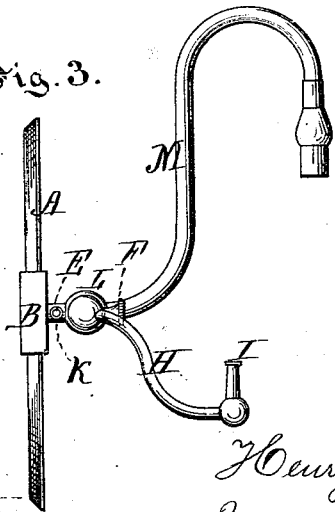
Witnesses:
John Tyler
Arthur L. McIntire
Inventor:
Henry Palmieri
By atty Wm C. McIntire
N. PETERS, PHOTO-LITHOGRAPHER, WASHINGTON, D.C.

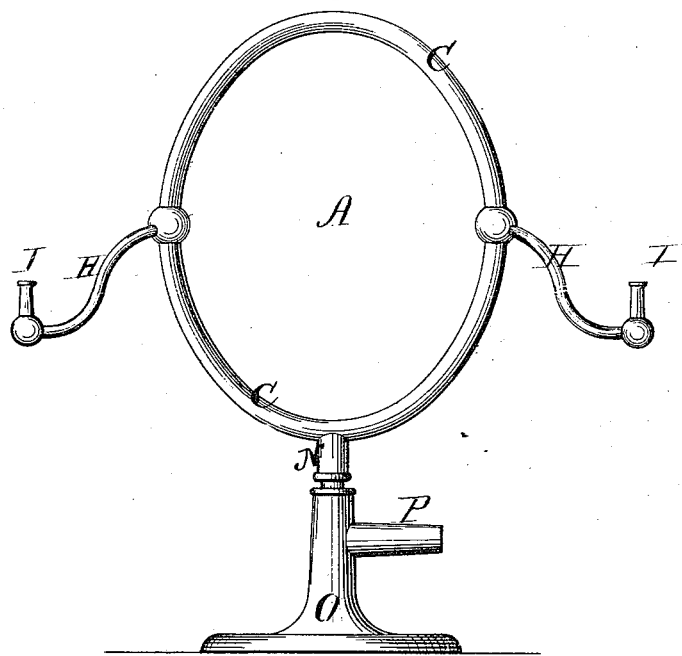
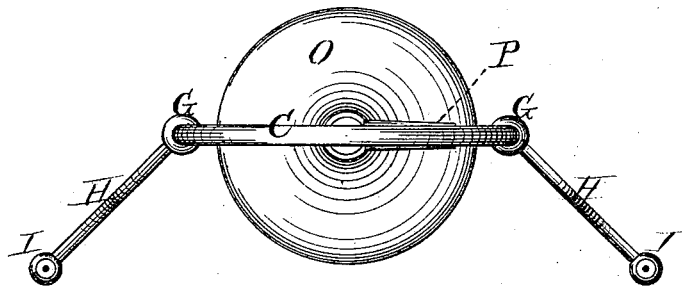

UNITED STATES PATENT OFFICE.

HENRY PALMIERI, OF NEW YORK, N. Y.

IMPROVEMENT IN TOILET-MIRRORS.

Specification forming part of Letters Patent No. 167,558, dated September 7, 1875; application filed February 26, 1875.

*To all whom it may concern:*

Be it known that I, HENRY PALMIERI, of New York, in the county of New York and State of New York, have invented certain new and useful Improvements in Hand-Mirrors; and I do hereby declare that the following is a full and exact description thereof, reference being had to the accompanying drawings, making a part of this application.

My invention relates to a novel construction of "hand-glass" or toilet-mirror. It has for its object to provide the mirror with a light which may be moved with it, and render the same very useful, and at the same time ornamental to a high degree; and with these ends in view my invention consists, first, in the combination, with a crystal or other mirror-glass, of a suitable gas-conveying frame and burners, capable of connection with an ordinary bracket or chandelier by a flexible tube or otherwise, so that the mirror may be handled or its locality changed, the light moving therewith, as will be hereinafter more fully explained; and secondly, in the novel construction and arrangements of the several parts of the gas-conveying devices, as will be more fully set forth hereinafter.

Previous to my invention what are known as toilet-mirrors or hand-glasses have been simply provided with a suitable handle, with or without a back, also, and adapted to be handled by those using them, in connection, more particularly, with the larger dressing-glass, whereby portions of the body invisible in the dressing-mirror may be reflected upon the same, and thus a perfect sight obtained of such portions of the body. While this result is very readily obtained during daylight, it has only been heretofore accomplished at night by a judicious arrangement of lights in and around the room or dressing-apartment.

To enable others to more fully understand my invention, and the means by which its objects are attained, I will proceed to describe the construction and arrangement of several modifications, referring by letters to the accompanying drawings, in which—

Figure 1 is a rear view of an oval crystal mirror provided with my gas conveying and consuming devices. Fig. 2 is a top view of the same, and Fig. 3 a side elevation; Fig. 4, a rear view of another modification of my invention, and Fig. 5 a top view thereof.

Similar letters indicate like parts in the several figures.

A represents a piece of ordinary or crystal mirror, across the back of which is secured, by suitable segmental ears B B, a tube, C, the tube C passing through bearings D, secured by short arms E to the ears B. The tube C is adapted to turn freely within its bearings D, and is held in any given adjustment therewith by a set-screw, F, on one of said bearings. The outer ends of the tube C are provided with permanent or adjustable joints G, to which are screwed short arms H, provided at their extreme ends with gas-burners I. K is a strengthening-rod, secured to the two short arms E, to give rigidity to the frame, and relieve the glass from undue strain. L is a suitable connection for the end of a short connecting-tube, M, adapted to be placed over and hang upon the burners of an ordinary side light or bracket; but this central connection L may be of such construction as to readily receive the soft or a metal end of a flexible tube.

Instead of the connecting-tube M rising upwardly, as shown, it may extend downwardly (or the glass may be swiveled upon its tube C) and be adapted to screw into an ornamental handle, provided with a nozzle to receive the end of the flexible connecting and supply pipe, as shown at Fig. 4, which represents a modification of the pipe C in that it extends or surrounds the glass, forming a neat and fancy frame therefor, provided at the lower side with a vertical tube, N, adapted to screw into or upon the end of a hollow handle and stand, O, P representing a nozzle to receive the end of the connecting and supply pipe.

When used as a hand-glass it is grasped by the handle O, the arms or brackets H being first adjusted so that the flame burning at I shall be slightly in rear of the mirror-surface, and held in any suitable position to reflect any portion of the body, the light burning at the points I being always in such relation to the glass and the object or portion of the body to be reflected that said body is suitably lit up to render the reflection bright and perfect.

When the brackets H are made adjustable, as described, they may be thrown in front of the mirror-surface, and a beautiful reflector is thus produced, which may be carried to any part of a room, (being limited only by the extent of the flexible connection with the supply-pipe or bracket,) and the reflected light thrown from any angle upon any painting or other object.

In the construction, as shown at Figs. 1, 2, and 3, the cross-tube C, by its movable connection with the bearings D, permits the swiveling of the glass, so that, if otherwise fixedly secured to a bracket, it may be turned up and down so as to reflect an image or light at various angles, and the mirror being secured to an ordinary gas-bracket, may be used as a permanent or temporarily permanent light; or, when provided with the handle and stand, as shown at Fig. 4, it may be used as an ordinary drop-light.

It will be readily seen that very many changes will suggest themselves in the manufacture and use of my improved mirror, and I have taken pains, in illustrating the scope of my invention, to show such construction and arrangement of parts as seems to me best adapted for the uses contemplated. I do not, therefore, wish to limit myself to the exact features of construction shown; but

What I claim as new, and desire to secure by Letters Patent, is—

1. In combination with a mirror-glass, a gas-conveying tube and suitable bracket-arms or burners, substantially as and for the purposes described.

2. In combination with the glass A, the ears B, arms E, bearings D, tube C, and set-screw F, whereby the glass may be adjusted relatively to the tube C, substantially as and for the purpose described.

3. The tubular frame C and bracket-arms H, in combination with the handle O, adapted to be secured to the frame C, substantially as and for the purposes set forth.

In testimony whereof I have hereunto set my hand and seal this 25th day of February, 1875.

H. PALMIERI. [L. S.]

In presence of—
JACOB DU BOIS,
C. M. BENJAMIN.